Nov. 6, 1956 C. D. MILLER 2,769,243
SETTING GAUGE FOR MOTE KNIFE BRACKETS
Filed Jan. 11, 1954 3 Sheets-Sheet 1

INVENTOR.
CHARLES D. MILLER
BY
Parrott & Richards
ATTORNEYS

Nov. 6, 1956     C. D. MILLER     2,769,243
SETTING GAUGE FOR MOTE KNIFE BRACKETS
Filed Jan. 11, 1954     3 Sheets-Sheet 2
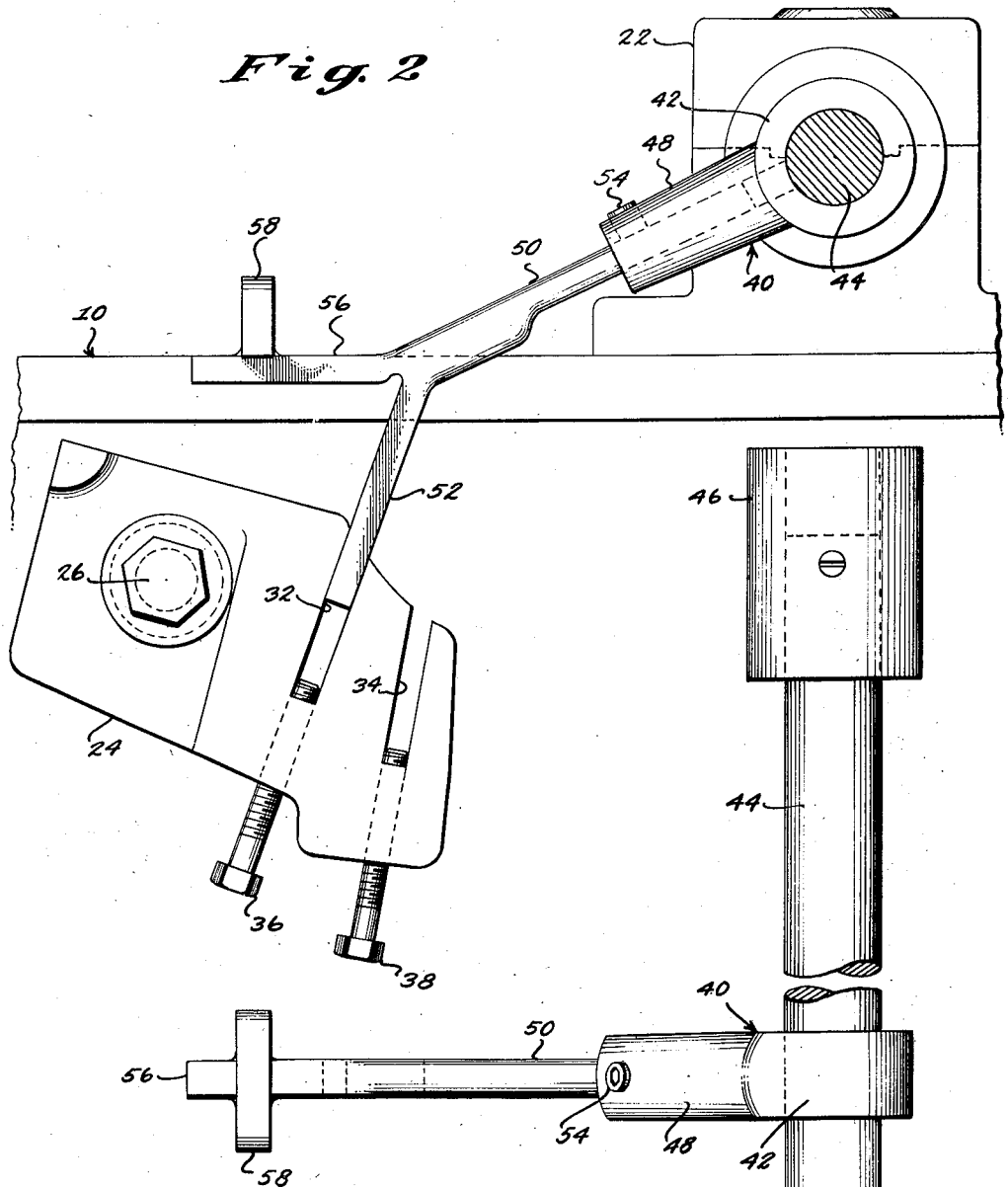
INVENTOR.
CHARLES D. MILLER
BY
Parrott & Richards
ATTORNEYS

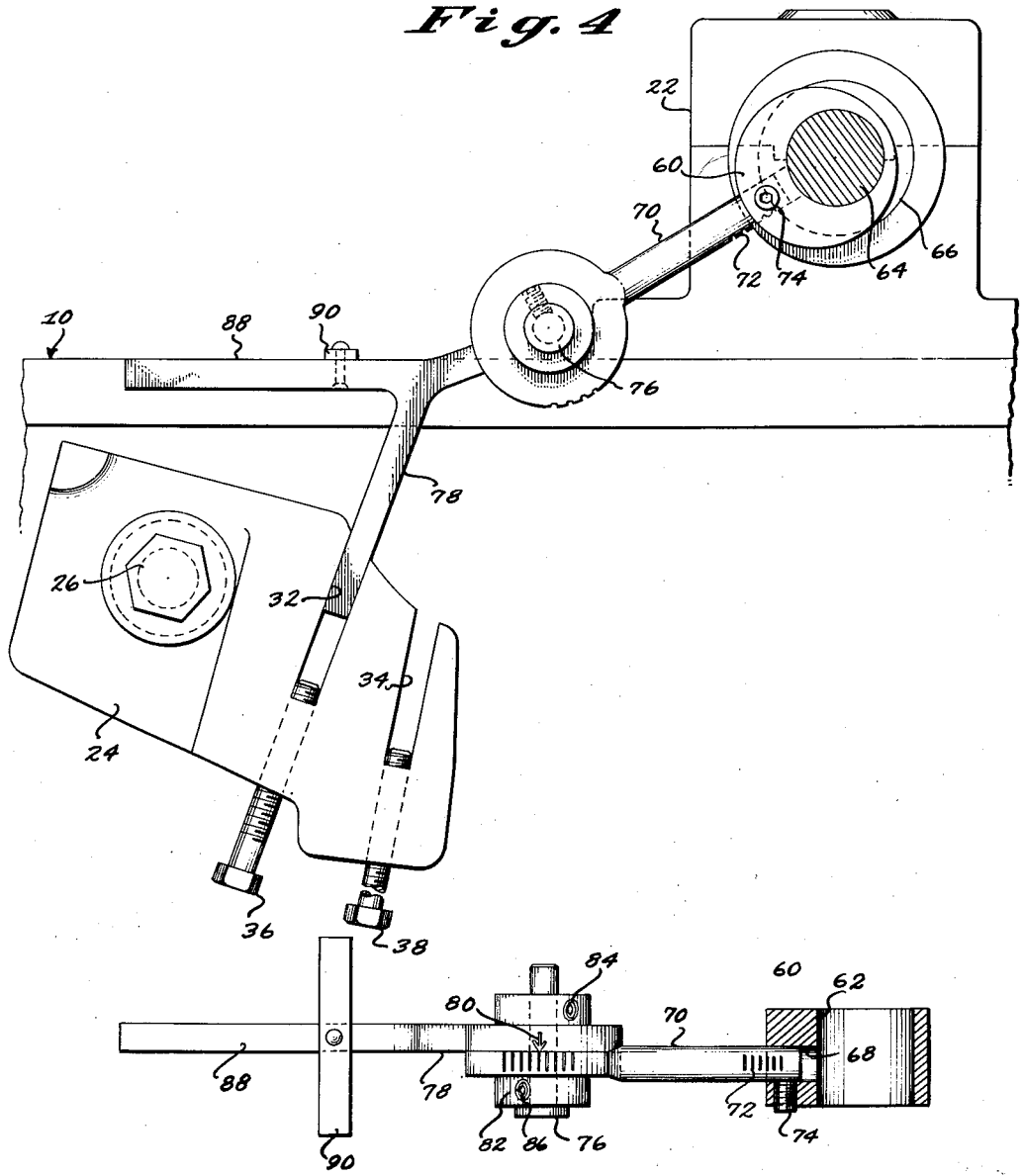

United States Patent Office 2,769,243
Patented Nov. 6, 1956

2,769,243

SETTING GAUGE FOR MOTE KNIFE BRACKETS

Charles D. Miller, Chester, S. C., assignor to
The Springs Cotton Mills

Application January 11, 1954, Serial No. 403,331

6 Claims. (Cl. 33—181)

This invention relates to gauge means for setting mote knife brackets in a card so as to obtain easily and accurately a proper setting for mote knives in relation to the licker-in roll of the card.

In the carding of cotton fiber it is conventional practice to set the licker-in roll in relation to the card cylinder and then adjust the mote knives in relation to the previously set licker-in roll. It is well known that the adjusted angle between the face of the mote knives and a line running radially from the axis of the licker-in roll to the knife faces has a pronounced effect on the quantity of waste removed and the quality of sliver produced by the card.

The usual procedure previously employed for adjusting the mote knives has been characterized by the use of a bubble level attached to the leading mote knife and fitted with a graduated scale in relation to which the mote knife brackets could be tilted to dispose the mote knife at a desired angle from the horizontal plane indicated by the bubble level. This previously employed procedure necessarily introduced considerable error in setting the mote knives because it not only depended upon the accuracy of the bubble level and of the setting scale provided therefor, as well as the accuracy with which the level was attached to the mote knife and the accuracy of observing the graduated scale setting at an awkward and difficultly accessible position within the card frame, but also added a substantial possibility for error by depending upon adjusting the mote knives in relation to an arbitrary horizontal plane determined by the bubble level, whereas the overall position of a card is not commonly leveled with any accuracy so that no dependable relation can be established in this way between the adjusted setting of the mote knife and the licker-in roll itself.

According to the present invention these errors are entirely eliminated by setting the mote knife brackets directly in relation to the position of the licker-in roll. For this purpose, the gauge means of the present invention comprises a reference shaft that is mountable axially in place of the licker-in roll, and a holder mounted radially on this reference shaft to carry a gauge arm angularly thereon in the relation to the reference shaft that is desired for the mote knives in relation to the licker-in roll. This gauge arm is formed to fit the mote knife brackets in place of one of the mote knives so that it may be used to set the brackets accurately in direct relation to the position of the licker-in roll before mounting of the mote knife in the brackets.

The gauge means of the present invention is described in further detail below in connection with the accompanying drawings, in which:

Fig. 2 is a further fragmentary elevation corresponding generally to Fig. 1, but showing the gauge means of the present invention disposed in place for setting the mote knife brackets;

Fig. 3 is a fragmentary plan view of the gauge means shown in Fig. 2;

Fig. 4 is a still further sectional elevation corresponding generally to Fig. 2, but showing a modified embodiment of the gauge means of the present invention; and Fig. 5 is a plan view of the modified gauge means shown in Fig. 4.

Figure 1:
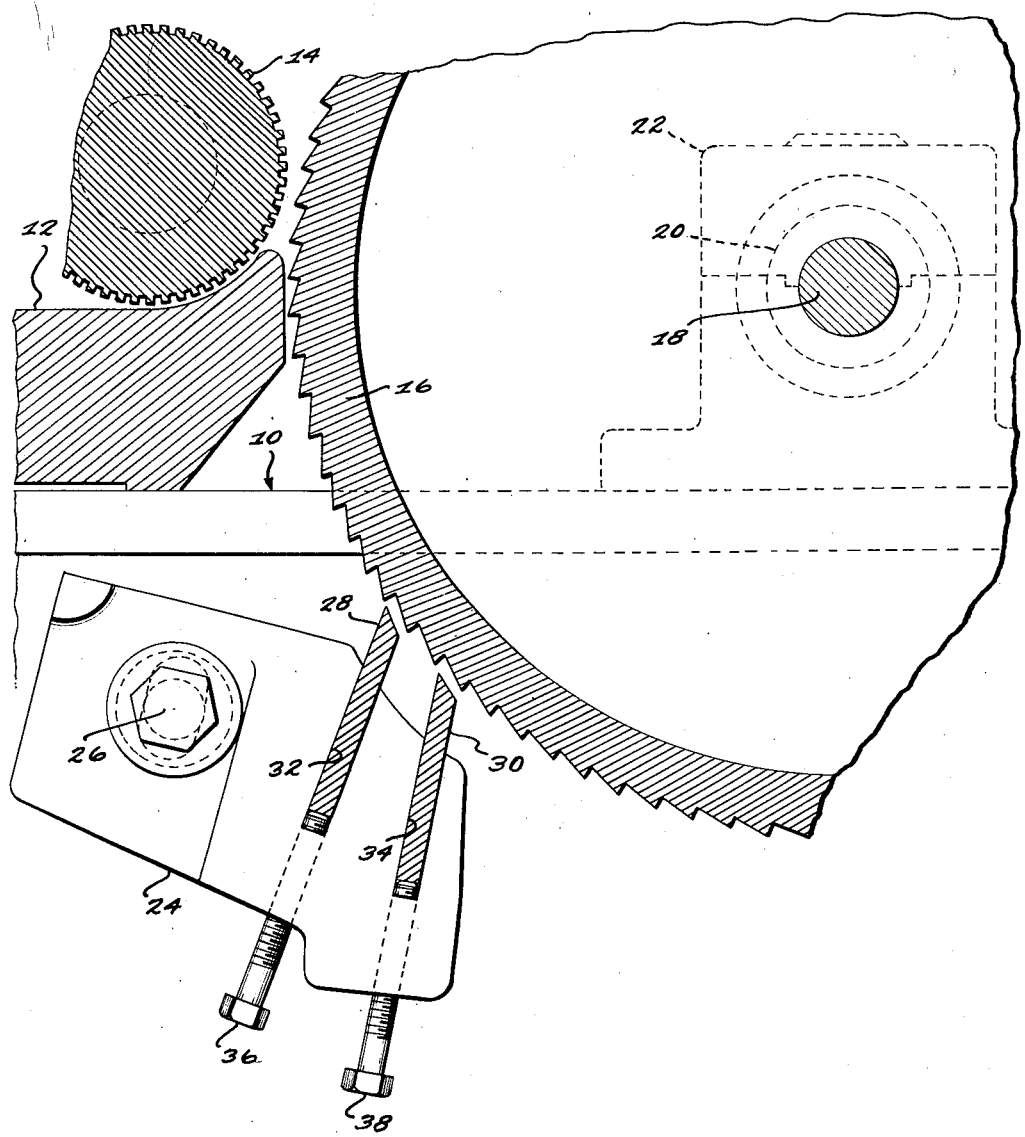
Fig. 1 is a fragmentary sectional elevation illustrating the operating arrangement of mote knives in relation to the licker-in roll of a card.

Referring now in detail to the drawings, and more particularly at first to Fig. 1, the reference numeral 10 indicates generally the portion of a card side frame at which a feed table 12 and a feed roll 14 are arranged in the conventional manner for delivering a picker lap to the licker-in roll 16 of the card, the licker-in roll 16 being carried on a shaft 18 fitted with bearing sleeves 20 for disposition in bearing mounts 22 supported on the card side frames 10.

The reference numeral 24 indicates a conventional form of mote knife bracket adjustably attached to the side frame 10 by a mounting bolt 26, it being understood that a mote knife bracket 24 is arranged as shown in Fig. 1 at each side frame of the card to support mote knives, such as 28 and 30 in relation to the licker-in roll 16, the brackets 24 being formed with mounting grooves 32 and 34 to receive the mote knives 28 and 30 for bottoming therein on adjustable backing screws 36 and 38.

Fig. 2 of the drawings shows the feed table 12, feed roll 14, licker-in roll 16, and mote knives 28 and 30 removed from the card frame 10, with a gauge means embodying the present invention arranged in place for setting the mote knife brackets 24. The gauge means shown in Fig. 2 comprises a gauge bracket or holder 40 formed with a collar portion 42 disposed rotatably and slidably on a reference shaft 44 mountable axially in place of the licker-in roll 16 in the bearing mounts 22, the shaft 44 being fitted for this purpose with mounting sleeves 46 which are made adjustable thereon for cards of different widths (see Fig. 3).

The gauge bracket 40 is further formed with a tubular holder portion 48 extending radially with respect to the reference shaft 44 and carrying the shank portion 50 of an angularly disposed gauge arm 52, the shank portion 50 being fixed in place by a set screw 54 so that it is adjustable extensibly in longitudinal alignment with the holder portion 48 for proper positioning of the gauge arm 52 in relation to the axis of the licker-in bearing mounts 22. Usually the proper longitudinal adjustment for the gauge arm shank 50 can be set initially to fix the gauge arm 52 in place and thereby provide a standard setting for the mote knife brackets 24. With the shank 50 properly set in the holder portion 48, the gauge arm 52 is disposed to extend angularly downward therefrom at the proper angle for the mote knife to be gauged, which will be the leading mote knife 28 according to standard practice.

In order to position gauge arm 52 for setting the mote knife brackets 24 thereto, a support arm 56 is arranged in branching relation above the gauge arm 52 and fitted with a cross arm 58 that extends at each side of the support arm 56 sufficiently to overlie and rest on the adjacent card side frame 10 and thereby support the gauge arm 52 in place while each mote knife bracket is being set. Accordingly, it is only necessary to hang the gauge means, so to speak, successively on each side frame 10, and set each mote knife bracket 24 thereto as if the gauge arm 52 were the leading mote knife 28, to adjust the mote knife brackets 24 easily and reliably in proper relation to the axis of licker-in roll 16. After setting the brackets 24 in this manner, the mote knives 28 and 30 may be mounted therein and finely adjusted through the backing screws 36 and 38 as to spacing from the peripheral surface of the licker-in roll 16, when replaced, by means of feeler gauges in the usual way.

Figs. 4 and 5 illustrate a modified embodiment of the gauge means of the present invention that incorporates means for adjustment to various mote knife settings so that it may be used handily where operating conditions require different settings from time to time. In this embodiment the gauge bracket 60 is formed with an eccentric lateral bore 62 providing a collar portion for rotatably and slidably fitting the reference shaft 64 arranged to fit the licker-in bearing mounts 22 at mounting sleeves 66, as in the previously described embodiment; and with a radial bore 68 providing a holder portion for receiving the gauge shank 70 extensibly therein, the shank 70 having scale markings 72 scribed thereon for setting in relation to the gauge bracket 60, with a set screw 74 being provided to fix the shank 70 in the radial bore 68 at a given scale setting.

The gauge shank 70 extends from the gauge bracket 60 to a knuckle joint formed about a pivot pin 76 at which the gauge arm 78 is mounted for angular adjustment in relation to a reference mark 80 and scale markings 82 scribed adjacently on hub portions of the gauge arm 78 and shank 70, respectively, that are fitted with set screws 84 and 86 bearing on the pivot pin 76 for fixing a given adjustment. A support arm 88 carrying a cross arm 90 again branches from the gauge arm 78 for positioning on the side frame 10 so that this embodiment may be used just as explained above in describing the first embodiment.

The present invention has been described in detail above for purposes of illustration only and is not intended to be limited by this description or otherwise except as defined in the appended claims.

I claim:

1. A gauge means for setting mote knife brackets in a card, said gauge means comprising a reference shaft arranged for mounting axially in place of the licker-in roll of said card, a holder mounted radially on said reference shaft, and a gauge arm fixed in said holder to extend angularly therefrom in the relation to said reference shaft desired for a mote knife in relation to the axis of said licker-in roll, said gauge arm being proportioned for fitting the mote knife mounting grooves in said brackets and being thereby disposable in said mounting grooves for setting said brackets prior to mounting a mote knife therein.

2. A gauge means for setting mote knife brackets in relation to the licker-in roll of a card, said gauge means comprising a reference shaft mountable axially in place of said licker-in roll when removed from the card, a holder mounted radially on said reference shaft, and a gauge arm carried angularly on said holder in the relation to said reference shaft desired for a mote knife in relation to the axis of said licker-in roll, said gauge arm fitting said brackets in place of a mote knife mountable thereon for setting said brackets prior to mounting of the mote knife.

3. A gauge means for setting mote knife brackets at each frame side of a card in relation to the licker-in roll thereof, said gauge means comprising a reference shaft mountable axially in place of said licker-in roll when removed from the card, a gauge bracket having a collar portion disposed rotatably and slidably on said reference shaft and a holder portion extending radially from said shaft, and a gauge arm carried angularly by said holder portion in the relation to said reference shaft desired for a mote knife in relation to said licker-in roll, said gauge arm fitting said brackets in place of a mote knife mountable thereon for setting each of said brackets prior to mounting of the mote knife.

4. A gauge means as defined in claim 3 and further characterized in that said gauge arm extends angularly from a shank portion thereof, and said shank portion is carried by said gauge bracket holder portion for extensible adjustment in longitudinal alignment therewith.

5. A gauge means as defined in claim 4 and further characterized in that said gauge arm shank portion is fitted with a knuckle joint for adjusting the angularity of said gauge arm.

6. A gauge means for setting mote knife brackets at each frame side of a card in relation to the licker-in roll thereof, said gauge means comprising a reference shaft mountable axially in place of said licker-in roll when removed from the card, a gauge bracket having a collar portion disposed rotatably and slidably on said reference shaft and a holder portion extending radially from said shaft, a gauge arm carried angularly by said holder portion in the relation to said reference shaft desired for a mote knife in relation to said licker-in roll, said gauge arm fitting said brackets in place of a mote knife mountable thereon for setting each of said brackets prior to mounting of the mote knife, a support arm branching from said gauge arm and with respect to which said gauge arm extends angularly downward, and a cross arm fixed on said support arm with an extending portion at each side thereof sufficient to overlie and rest on the adjacent card frame side and thereby support said gauge arm in place while setting each of said brackets.

References Cited in the file of this patent

UNITED STATES PATENTS

| | | |
|---|---|---|
| 871,053 | Winningham | Nov. 13, 1907 |
| 1,290,789 | Schendel | Jan. 7, 1919 |
| 2,155,562 | Price | Apr. 25, 1939 |
| 2,504,249 | Bruce | Apr. 18, 1950 |